United States Patent
Plumeier

(10) Patent No.: US 6,992,563 B1
(45) Date of Patent: Jan. 31, 2006

(54) METHOD FOR PROTECTING DEVICES, SPECIALLY CAR RADIOS, AGAINST THEFT

(75) Inventor: Joerg Plumeier, Salzgitter (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/402,907

(22) PCT Filed: Apr. 8, 1996

(86) PCT No.: PCT/DE98/00984

§ 371 (c)(1),
(2), (4) Date: Oct. 12, 1999

(87) PCT Pub. No.: WO98/46455

PCT Pub. Date: Oct. 22, 1998

(30) Foreign Application Priority Data

Apr. 11, 1997 (DE) ................ 197 15 049

(51) Int. Cl.
*H04K 1/00* (2006.01)
(52) U.S. Cl. .......... 340/5.54; 340/5.28; 340/5.57; 713/183
(58) Field of Classification Search ........ 713/184, 713/183; 379/93.02; 340/5.31, 427, 437, 340/432, 5.72, 26, 5.28, 5.54, 5.57; 307/10.2, 307/10.3; 701/36; 235/382
See application file for complete search history.

(56) References Cited

U.S. PATENT DOCUMENTS

| | | | |
|---|---|---|---|
| 4,759,062 A | | 7/1988 | Traub et al. ............... 380/25 |
| 5,091,939 A | * | 2/1992 | Cole et al. ................. 713/183 |
| 5,394,471 A | * | 2/1995 | Ganesan et al. ........... 713/183 |
| 5,594,793 A | | 1/1997 | Bahout et al. ............. 380/4 |
| 5,761,301 A | * | 6/1998 | Oshima et al. ............ 705/57 |
| 5,774,065 A | * | 6/1998 | Mabuchi et al. .......... 340/825.72 |
| 5,774,550 A | * | 6/1998 | Brinkmeyer et al. ...... 380/21 |
| 6,377,160 B1 | * | 4/2002 | Groeger ..................... 340/5.6 |

FOREIGN PATENT DOCUMENTS

| | | |
|---|---|---|
| DE | 36 41 230 | 4/1988 |
| DE | 42 42 186 | 6/1994 |
| EP | 0 767 087 | 4/1997 |
| WO | WO 98/05532 * | 2/1998 |

* cited by examiner

*Primary Examiner*—Michael Horabik
*Assistant Examiner*—Matsuichiro Shimizu
(74) *Attorney, Agent, or Firm*—Kenyon & Kenyon

(57) ABSTRACT

A method for providing an anti-theft mechanism for devices, in particular for car radios, in that a code which identifies the device must be entered directly into the device in order to activate the device. The code is derived from an item of check information assigned to the device, using an irreversible encryption method.

9 Claims, 3 Drawing Sheets

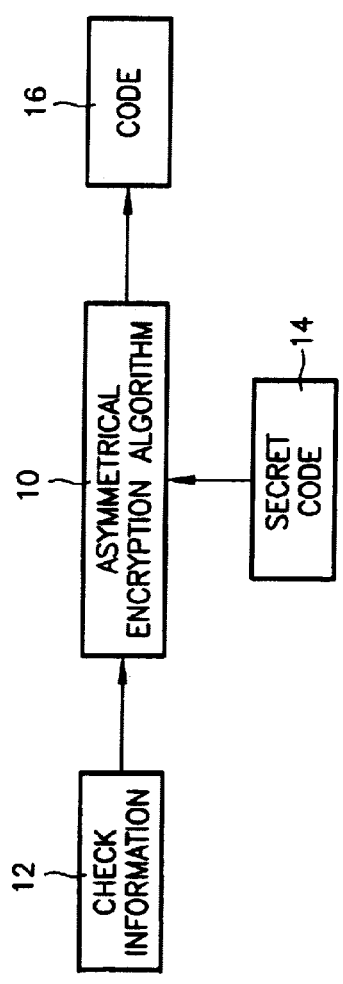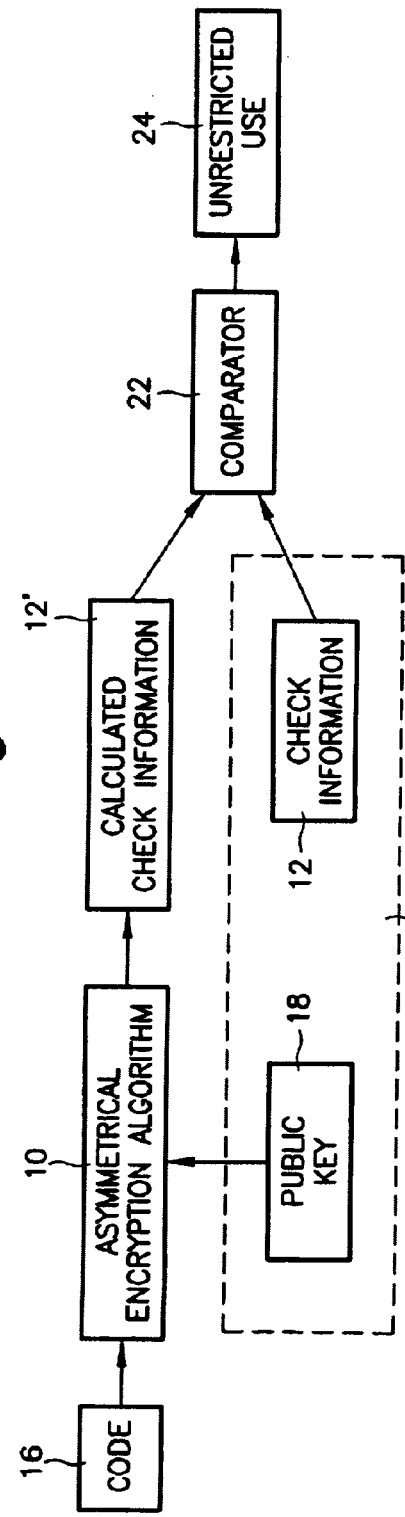

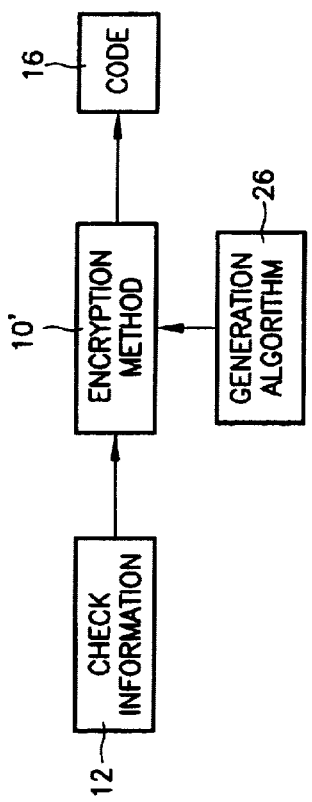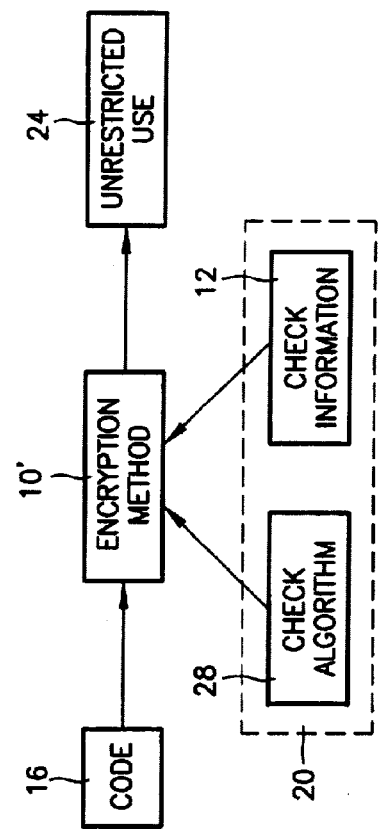

METHOD FOR PROTECTING DEVICES, SPECIALLY CAR RADIOS, AGAINST THEFT

FIELD OF THE INVENTION

The present invention relates to a method for providing an anti-theft mechanism for devices, in particular for car radios, in which a code that identifies the device must be entered directly into the device in order to activate the device.

BACKGROUND INFORMATION

Conventional means of providing car radios with an anti-theft code are known. For this purpose, a secret code is stored in a memory assigned to the car radio. This code can be stored, for example, in an internal or an external EEPROM (Electrically Erasable Programmable Read-Only Memory). The first time the car radio is activated, or when it is reactivated following an interruption of the power supply for the car radio, the code must be entered directly into the car radio. This can be done either manually using input keys or using an external code card. A processor unit integrated into the car radio compares the stored secret code with the entered code and, if the two codes match, enables unrestricted use of the car radio.

The disadvantage of this method is that the secret code stored in the car radio can be read relatively easily. Unauthorized reading of the code enables unauthorized users to gain access to the code and thus to activate the car radio as well.

SUMMARY OF THE INVENTION

The method according to the present invention features offers the advantage over the conventional means in that a device provided with an anti-theft mechanism cannot be used without authorization. Because the code is derived from an item of check information assigned to the device using an irreversible encryption method, the anti-theft code itself is not stored in the device. This prevents unauthorized persons from reading this code and from improperly using it to activate the device without authorization. For example, asymmetrical methods, in particular the RSA (Revest Shamir Edelmann) method, are used as the irreversible encryption method. The advantage of these methods is that, they offer a very high cryptographic quality, which means that information that has been encrypted by an asymmetrical method can be decrypted only by systematic trial and error, which involves a great deal of time and computing power and is not economically justified by the benefits gained.

According to an embodiment of the present invention, a public key of the encryption method and the encryption output information (check information), in particular a serial number of the device to be protected, are stored in a processor or in a memory element assigned to the processor in the device. Knowledge of this information does not enable an unauthorized user to determine the code for unrestricted use of the to be protected device. Only after the authorized user has entered the code externally, for example manually or using a code card, is the check information calculated and then compared with the stored check information, with the device enabled if the two items of check information match.

According to a another embodiment of the present invention, both the check information and a check algorithm are stored in the protected device. This makes it advantageously possible to minimize the amount of effort needed for encryption, at the same time maintaining an irreversible encryption method. An irreversible encryption method of this type can be provided even without the relatively complicated use of a complete asymmetrical method by storing a check algorithm for a code, but not the algorithm for generating the code. The check algorithm and the check information, which can be read out, also make it possible to obtain the algorithm for generating the code, and thus the code itself, only with a great deal of effort.

BRIEF DESCRIPTION OF THE DRAWINGS

FIG. 1 shows a first schematic representation of an encryption system for a device according to the present invention.

FIG. 2 shows a first schematic representation of a method for activating an encrypted device according to the present invention.

FIG. 3 shows a second schematic representation of an encryption system for a device according to the present invention.

FIG. 4 shows a second schematic representation of a method for activating a device encrypted according to the present invention.

DETAILED DESCRIPTION

Figure 5:
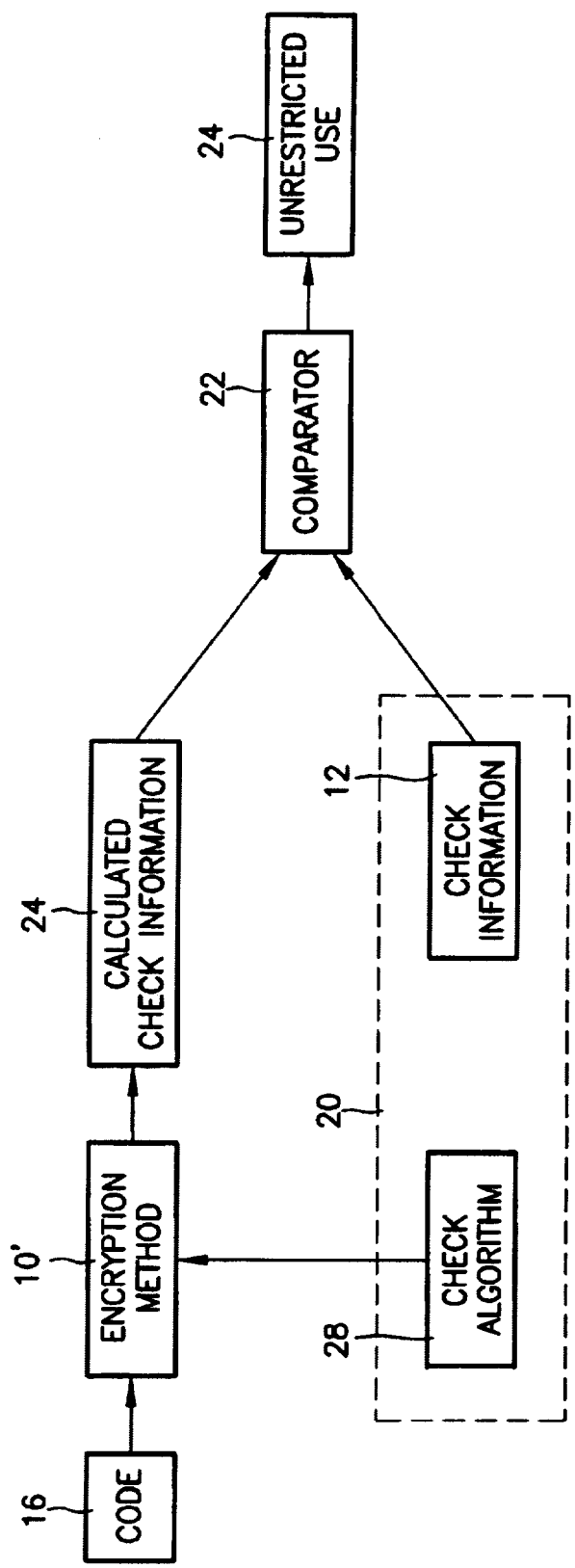
FIG. 5 shows a third schematic representation of a method for activating a device encrypted according to the present invention.

Based on the embodiments explained below, the description concerns the generation and use of an anti-theft code for car radios. However, this method can, in principle, be used for all devices in need of protection.

FIG. 1 shows the generation of the code according to the present invention. In this case, an asymmetrical encryption algorithm 10 is provided with an item of check information 12 to which a secret code 14 is applied, thus forming a code 16. For example, the serial number of the protected device i.e., the serial number of the car radio, for example, can be used as check information 12. Code 16 is generated from this serial number, or a portion of the serial number, for example a selection of any individual digits in the serial number, using secret key 14 in a protected environment during production of the car radio. Code 16 is supplied with the car radio when it is first shipped from the factory or when it is intentionally transferred to another party. This can be done, for example, by communicating the code in writing or by supplying a code card on which code 16 is stored.

The car radio itself contains a processor unit in which check information 12 in the form of invariable information and a public key 18 of asymmetrical encryption method 10 are stored.

Car radio 20 indicated in FIG. 2 contains public key 18 and check information 12, but not code 16, which is needed to activate or reactivate car radio 20. To activate or reactivate car radio 20 in an authorized manner, the authorized user enters code 16 into the processor of car radio 20. This can be done, for example, by entering code 16, which was communicated in writing, using a key or by inserting a code card. Asymmetrical encryption method 10 determines a calculated item of check information 12' on the basis of entered code 16 and public key 18. Check information 12' is compared with invariable stored check information 12 in a comparator 22. If comparator 22 finds a match between check information 12 and calculated check information 12', car radio 20 is enabled for unlimited user 24.

It is apparent that, upon the theft of car radio 20, public key 18 of asymmetrical encryption method 10, to which anyone can gain access in any case, and the check information, for example the serial number, which is also generally accessible, are available, while code 16 for determining calculated check information 12' remains inaccessible. In addition, code 16 cannot be determined on the basis of public key 18 of asymmetrical encryption method 10.

It is also perfectly apparent that car radio 20 cannot be activated or reactivated without knowledge of code 16.

Because the irreversible asymmetrical encryption method described on the basis of FIGS. 1 and 2 involves an amount of effort that is not justified by the economic benefit gained for certain groups of protected devices a simplified irreversible encryption method is described on the basis of FIGS. 3 and 4.

As illustrated in FIG. 1, check information 12, for example the serial number of the car radio, is supplied to an encryption method 10'. A generation algorithm 26 is used to derive code 16 from the check information. Code 16 is then supplied with the car radio either in writing or in the form of a code card.

As shown in FIG. 4, car radio 20 is activated or reactivated by entering code 16 into car radio 20. Encryption method 10' applies a check algorithm 28 and check information 12 to code 16. Check algorithm 28 checks code 16 to see whether the latter can be associated with check information 12. If check algorithm 28 determines that code 16 belongs to car radio 20 containing check information 12, it enables car radio 20 for unrestricted use 24.

The irreversible encryption method explained on the basis of FIGS. 3 and 4 is also characterized in that car radio 20 contains neither code 16 nor algorithm 26 for generating code 16. It includes only check information 12 and check algorithm 28, which does not provide direct access to code 16 even if it is output by an unauthorized person. Only after completing a complicated analysis of check algorithm 28 is it possible to gain access to algorithm 26 for generating code 16. As a result, even this simplified irreversible encryption method provides an anti-theft mechanism for car radios 20 or other devices in need of protection.

Depending on the level of protection required by the protected devices, it is possible to select either the more complicated asymmetrical encryption method described according to FIGS. 1 and 2 or the simpler pseudo-asymmetrical encryption method described according to FIGS. 3 and 4.

FIG. 5 shows a method for activating a device encrypted according to the present invention in which code 16 and check algorithm 28 are supplied to encryption method 10', which generates check information 12' from them. Check algorithm 28 and check information 12 are both stored in car radio 20. Comparator 22 compares check information 12' to check information 12 in the car radio and; if the two items of information match, enables the car radio for unrestricted use 24.

What is claimed is:

1. A method for preventing an unauthorized use of a device, comprising the steps of:

generating a code from a first item of check information using an irreversible encryption method;

assigning the code to the device, the code being entered directly into the device to activate the device;

storing the first item of check information in the device for authorization purposes;

generating a second item of check information from the code using the irreversible encryption method;

comparing the first item of check information with the second item of check information; and storing a check algorithm for the code and the second items of check information in the device.

2. The method according to claim 1, wherein the device is a car radio.

3. The method according to claim 1, wherein the irreversible encryption method includes asymmetrical encryption methods.

4. The method according to claim 1, wherein the irreversible encryption method is a Revest Shamir Edelmann method.

5. The method according to claim 1, wherein the code is generated in a secure location using a secret key.

6. The method according to claim 1, further comprising the step of:

storing a public key for the code in the device.

7. The method according to claim 8, wherein the check information is one of a serial number of the device and a portion of the serial number of the device.

8. A method for preventing an unauthorized use of a device, comprising the steps of:

causing an irreversible encryption method to apply a generation algorithm to an item of check information to generate a code;

assigning the code to the device, the code being entered directly into the device to activate the device;

storing a check algorithm for the code and the item of check information in the device;

causing the irreversible encryption method to apply the check algorithm and the item of check information to the code; and causing the check algorithm to check the code to determine whether the code is associated with the item of check information.

9. A method for preventing an unauthorized use of a device, comprising the steps of:

generating a code from a first item of check information using an irreversible encryption method;

assigning the code to the device, the code being entered directly into the device to activate the device;

storing the first item of check information in the device for authorization purposes;

generating a second item of check information from the code using the irreversible encryption method; and comparing the first item of check information with the second item of check information.

* * * * *

UNITED STATES PATENT AND TRADEMARK OFFICE
CERTIFICATE OF CORRECTION

| | | |
|---|---|---|
| PATENT NO. | : 6,992,563 B1 | |
| APPLICATION NO. | : 09/402907 | |
| DATED | : January 31, 2006 | |
| INVENTOR(S) | : Joerg Plumeier | |

It is certified that error appears in the above-identified patent and that said Letters Patent is hereby corrected as shown below:

On the title page item (54), and Col. 1, line 2, replace the title with the following:
--METHOD FOR PROTECTING DEVICES, SPECIFICALLY CAR RADIOS, AGAINST THEFT--

On the title page item (57) Abstract, line 2, change "in that a code which identifies" to --in which a code that identifies--

Column 1, line 34, delete "features"

Column 1, line 58, delete "to be"

Column 3, line 15, change "of protected devices" to --of protected devices,--

Column 4, line 27, change "according to claim 8," to --according to claim 1,--

Signed and Sealed this

Twenty-first Day of November, 2006

JON W. DUDAS
*Director of the United States Patent and Trademark Office*